United States Patent [19]

Frederick

[11] Patent Number: 4,578,769
[45] Date of Patent: Mar. 25, 1986

[54] DEVICE FOR DETERMINING THE SPEED, DISTANCE TRAVERSED, ELAPSED TIME AND CALORIES EXPENDED BY A PERSON WHILE RUNNING

[75] Inventor: Edward C. Frederick, Kingston, N.H.

[73] Assignee: Nike, Inc., Beaverton, Oreg.

[21] Appl. No.: 465,274

[22] Filed: Feb. 9, 1983

[51] Int. Cl.$^4$ ............................................. G01C 22/00
[52] U.S. Cl. .................................. 364/565; 364/410; 364/561; 340/323 R; 235/105
[58] Field of Search ............... 364/143, 561, 565, 413, 364/410, 469, 417; 340/323 R; 235/105, DIG. 5; 272/100; 375/5; 73/489, 490

[56] References Cited

U.S. PATENT DOCUMENTS

| | | | |
|---|---|---|---|
| 3,540,344 | 11/1970 | Veech | 84/484 |
| 3,580,083 | 5/1971 | Zipser | 272/69 |
| 3,789,402 | 1/1974 | Heywood | 340/328 |
| 3,797,010 | 3/1974 | Adler et al. | 340/323 R |
| 3,882,480 | 5/1975 | Greber | 340/321 |
| 3,893,099 | 7/1975 | Zoepfl | 340/321 |
| 3,974,491 | 10/1976 | Sipe | 177/209 |
| 4,019,030 | 4/1977 | Tamiz | 235/105 |
| 4,053,755 | 10/1977 | Sherrill | 364/561 |
| 4,144,568 | 3/1979 | Hiller et al. | 364/410 |
| 4,175,446 | 11/1979 | Crowninshield | 235/105 |
| 4,220,996 | 9/1980 | Searcy | 364/561 |
| 4,281,389 | 7/1981 | Smith | 364/569 |
| 4,285,041 | 8/1981 | Smith | 364/569 |
| 4,312,358 | 1/1982 | Barney | 128/670 |
| 4,371,945 | 2/1983 | Karr et al. | 364/561 |
| 4,380,802 | 4/1983 | Segar et al. | 364/413 |
| 4,387,437 | 6/1983 | Lowrey et al. | 364/561 |

FOREIGN PATENT DOCUMENTS

82/03753  11/1982  PCT Int'l Appl.

OTHER PUBLICATIONS

Pathokinesiology Service Lab Information, Rancho Los Amigos Hospital, Downey, California (date unknown).
Bernstein, Paul, "Anatomy of a Motion", Passages, 1982, p. 35.
Saito, M., et al., "Temporal Patterns in Running" (date unknown), pp. 107–111.
Hoshikawa, T. et al., "Analysis of Running Pattern in Relation to Speed", Medicine and Sport, vol. 8 (1973), pp. 342–348.
Hogberg, Paul, "Length of Stride, Stride Frequency, Flight, 'Period and Maximum Distance Between the Feet', During Running with Different Speeds", Arbeitsphysiologie, Bd., vol. 14 (1952), pp. 431–436.
Luhtanen, P. et al., "Mechanical Factors Influencing Running Speed", Mechanics of Running, (date unknown) pp. 23–29.
"Annual Reports of Progress", from Rancho Los Amigos Rehabilitation Engineering Center at University of Southern California, Downey, California 90242, 1974, 1975, 1976, 1979, 1980.

(List continued on next page.)

Primary Examiner—Gary Chin
Attorney, Agent, or Firm—Banner, Birch, McKie & Beckett

[57] ABSTRACT

A device for measuring the speed of a person while running along a surface is disclosed. A pressure switch or transducer located in a shoe senses when a foot of the runner is in contact with the surface and produces a foot contact signal having a duration proportional to the time the foot is in contact with the surface. A radio frequency transmitter is coupled to the pressure switch or transducer and transmits the foot contact signal. A radio frequency transmitter receives the foot contact signal transmitted by the frequency transmitter and a microprocessor coupled to the radio frequency receiver calculates, solely from the foot contact signal, an output speed signal representing the speed of the runner. A liquid crystal display coupled to the output of the microprocessor displays the speed of the runner in accordance with the output speed signal.

25 Claims, 4 Drawing Figures

OTHER PUBLICATIONS

"Foot Switch Telemetry System Operating Manual", B & L Engineering, Santa Fe-Springs, California 90670, (date unknown).

"Miniature Pressure Transducers–Catalog and Price List", Precision Measurement Co., Ann Arbor, Michigan.

Stewart, David M., "Coached by Computer", American Way, Nov. 1982, pp. 35-38.

"Gait Analysis Instrumentation", from B & L Engineering, Santa Fe-Springs, Colorado 90670 (date unknown).

Hogberg, Paul, "How do Stride Length and Stride Frequency Influence the Energy Output During Running?", Arbeitsphysiologie, Bd, vol. 14 (1952), pp. 437-441.

DEVICE FOR DETERMINING THE SPEED, DISTANCE TRAVERSED, ELAPSED TIME AND CALORIES EXPENDED BY A PERSON WHILE RUNNING

BACKGROUND OF THE INVENTION

This invention relates generally to the field of measuring instruments and is particularly directed to a method and apparatus for determining the speed, distance traversed, running elapsed time and calories expended by a person while running.

In recent years, concern over the increasing numbers of cardiovascular illnesses reported each year has led to much greater public awareness of the importance of maintaining good physical body conditioning. This concern has spawned the development of a wide variety of health spas, fitness centers and other similar commercial establishments. While many of these facilities offer excellent fitness programs, a large number of individuals are foreclosed from participation because they do not have the time, financial resources or a convenient schedule to devote to a professionally supervised fitness program. Many individuals have, therefore, turned to their own fitness program of regular jogging. As used herein, jogging is also intended to include running and the two words are used interchangably.

Jogging has long been recognized for its therapeutic effects on the body. It increases cardiopulmonary fitness, helps to lower blood pressure, decreases cholesterol and triglyercides associated with heart disease and reduces weight. Jogging is also one of the easiest exercises to do. It requires no athletic ability and can be done almost any time and any place with a minimum of equipment and without assistance. In more recent times, jogging has also gained acceptance for its recreational value as well and is recognized as a positive factor in establishing psychological stability. The popularity of jogging today is well documented by the large numbers of products and literature available to the running public.

As in many exercise and sporting endeavors, there exists in the prior art a wide variety of devices for aiding those who jog. The simplest running aids are basic pacing timers as disclosed in U.S. Pat. No. 3,540,344 to Veech and U.S. Pat. No. 3,882,480 to Greber. Pacing timers generate a repetitive audio tone signal at selected intervals for pacing the strides of the runner. The length of the interval between tones is adjusted to suit the pace of the individual jogger.

There are other running aids known in the prior art such as pedometers as disclosed in U.S. Pat. No. 4,053,755 to Sherrill. These devices usually count the number of steps taken and for a particular stride length, the approximate distance traversed can be determined.

While pacing timers and pedometers are useful to the jogger, they are deficient in several areas. For example, it is known that above a certain speed, stride length begins to increase as speed increases. The relationship of stride length to speed is not directly proportional and is different for each jogger. It is, therefore, a difficult task to determine the correct stride length for an individual jogger at various speeds. Thus, pacing timers can provide no more than a constant running pace and pedometers are only useful as an approximation of distance traversed.

Running aids known in the prior art are further deficient in that they add weight to the runner while providing only marginal utility in terms of the amount of information available and its accuracy. Further, it has become desirable to accurately measure the speed of amateur and professional runners, both in training and during competition. In the prior art, such measurements were made with a stop watch timing the runner over a known distance. Heretofore, it has not been possible to obtain accurate instantaneous speeds of runners using the measuring devices currently known in the prior art.

With the foregoing in mind, the ideal running aid should, therefore:
1. be light in weight;
2. serve a number of useful functions;
3. be inexpensive;
4. provide measurements that are readily available to the user;
5. be reliable and easy to use; and
6. provide accurate measurements of speed, distance traversed, running time elapsed calories expended and other useful information.

SUMMARY OF THE INVENTION

It is the overall object of this invention to provide a new and improved running aid which overcomes the disadvantages of the prior art devices and substantially increases the amount and accuracy of information available to the jogger.

A specific object of this invention is to provide a new and improved running aid in which the speed of the runner or jogger can be easily and accurately determined.

A further specific object of this invention is to provide a new and improved running aid in which the distance traversed by the runner or jogger can be easily and accurately determined.

A still further object of this invention is to provide a new and improved running aid in which the elapsed time of the run can be determined.

Another specific object of this invention is to provide a new and improved running aid in which the calories expended by the runner or jogger can be easily determined.

A still further specific object of this invention is to provide a new and improved running aid which also includes the date, time of day, stop watch an alarm signals.

A still further object of this invention is to provide a new and improved running aid having the above advantages which is light in weight, relatively inexpensive and is convenient to use.

This invention comprises a measuring apparatus having a foot contact sensing transducer or switch located in the shoe of the jogger or runner for providing a first output signal when a foot of the runner is in contact with the running surface and a second output signal when the foot is not in contact with the surface. Reference to the foot being in contact with the surface is intended to broadly include contact with the surface through the sole of the shoe. Laboratory tests have shown that a definite relationship exists between the length of time that a foot of a runner is in contact with the running surface and the speed at which the person is running. At speeds between approximately 4 and 12 minutes per mile this relationship is approximately linear and can be accurately determined for each particular person.

Prior to initially using the running aid of the invention, the device is set to a calibration mode in which the precise foot contact time/speed relationship of the user is determined. This is accomplished by the user running a measured distance at two relatively constant but distinctly different speeds. In the calibration mode, the running aid measures and stores the length of each foot contact time, the number of foot contacts and the running elapsed time for each calibration run, and calculates the average foot contact time and speed for each run. Since the relationship between contact time and speed is linear, a linear equation is used and the constants for the equation are calculated for the two sets of average foot contact times and associated speeds. A line drawn between the calculated points, and the linear equation with its specific constants calculated, thus represents the relationship between foot contact time and speed. Accordingly, for a given foot contact time, speed can be accurately determined.

It is anticipated that the running aid will only be calibrated once. The correct foot contact time/speed relationship for the user, i.e., the constants for the linear equation, is virtually indefinitely stored and need only be redetermined when the running aid is used by a different person. Alternatively, the foot contact time/speed relationship, i.e., the linear equation with average constants, for the average runner can be initially stored in the running aid and can be used without re-calibrating the device. This would relieve the user from having to go through the initial calibration process. A suitable empirically determined linear equation with average constants would be y (speed—min.-/mile) = $-1.46 + 41.5 \times$ (contact time in seconds).

In the run mode, the user need only start the device at the beginning of the jog or run. Foot contact time is then determined and converted to speed using the above-described relationship between foot contact time and speed.

Once speed is determined, distance traversed is merely calculated from the product of the speed and elapsed running time. Calories expended may be calculated from the empirically derived equation: Kilocalories = $0.98 \times$ body weight $\times$ distance traversed, with body weight being in kilograms and distance traversed being in kilometers.

DESCRIPTION OF THE PREFERRED EMBODIMENT

Figure 1:
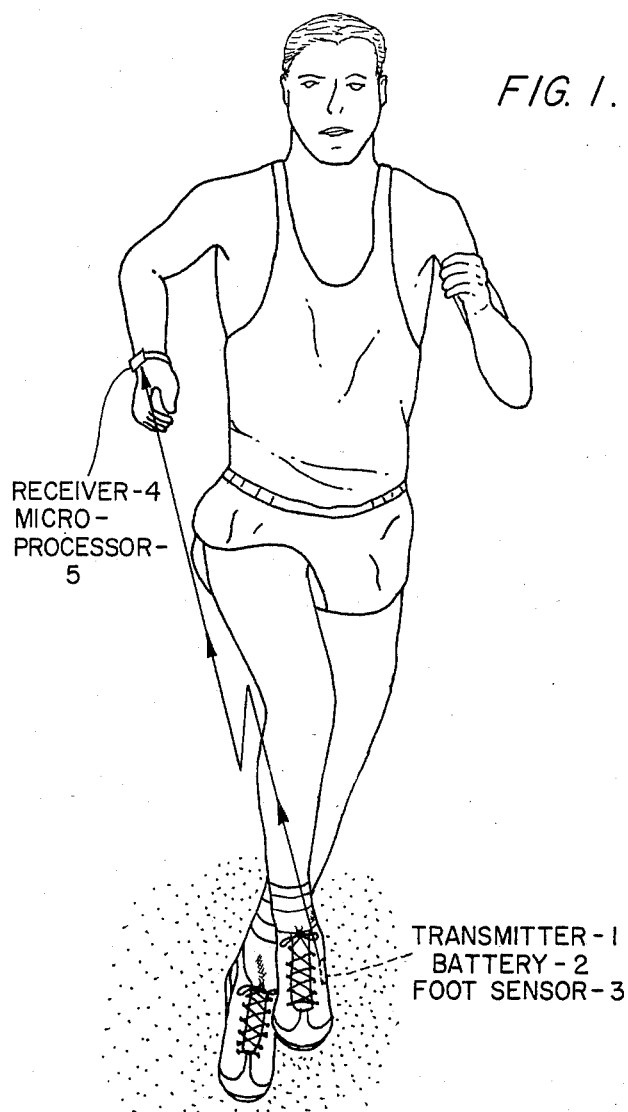
FIG. 1 is a perspective view of a jogger showing a foot sensor, battery and transmitter in the shoe of the jogger and a receiver and microprocessor worn on his wrist.

Referring now in detail to the drawings, the measuring apparatus of this invention consists of a number of interrelated elements as shown in FIGS. 1–4. With reference to FIG. 1, the invention includes transmitter 1, battery 2 and foot sensor 3, all of which are located in a shoe of the runner as will be explained in more detail below. Also shown in FIG. 1 is radio receiver 4 located on the wrist of the user for receiving a transmitted signal from transmitter 1. Receiver 4 may alternatively be located at a remote site so that the performance of the runner can be monitored by another person. Coupled to receiver 4 is microprocessor 5 for processing the received signals into the speed of the runner, distance traversed, running elapsed time and calories expended by the runner, the values of which may selectively be displayed. Microprocessor 5 also provides for normal watch functions, such as time of day, date, alarm and stop watch signals which may also be selectively displayed.

Figure 2:
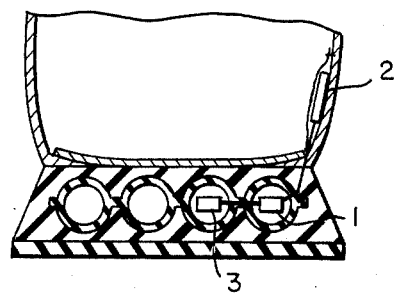
FIG. 2 is a sectional view of a running shoe showing the location of the foot sensor, battery and transmitter.

FIG. 2 is a sectional view of a shoe and illustrates the location of transmitter 1, battery 2 and foot sensor 3. Transmitter 1 and foot sensor 3 are located in the sole of the shoe with its precise location not being critical as long as foot sensor 3 reliably provides a first output signal representing the foot of the runner being in contact with the ground and a second output signal representing the foot of the runner not being in contact with the ground. One suitable location for foot sensor 3 is in the medial arch area of a midsole. In this area, sufficient pressures are generated to activate the sensor. The pressures, however, are relatively low compared to pressures generated in other areas of the midsole so that damage to the sensor is minimized. For example, FIG. 2 illustrates transmitter 1 and sensor 3 carried in gas filled chambers of a midsole. Battery 2 is shown mounted in the side of the shoe so that it may be easily and conventionally replaced when required.

Figure 3:
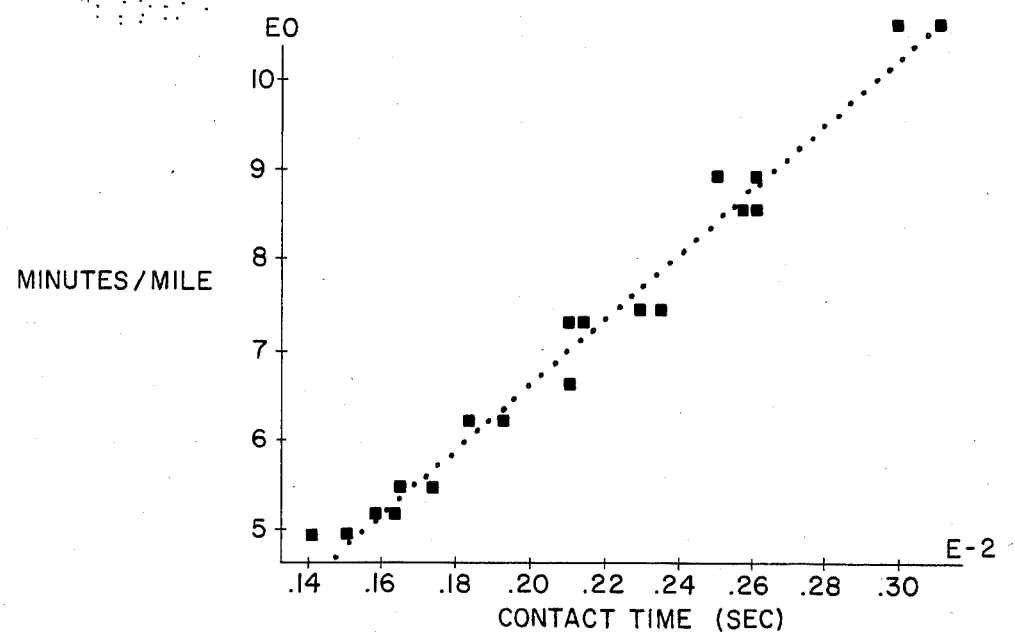
FIG. 3 is a graph showing the relationship between foot contact time in seconds and speed in minutes per mile.

FIG. 3 represents the linear relationship between the amount of time in seconds that a foot of the runner is in contact with the running surface and the speed in miles per minute being run as empirically determined for a particular runner. This relationship, while different for each person, is linear for the same person over the normal range of running or jogging speeds.

Figure 4:
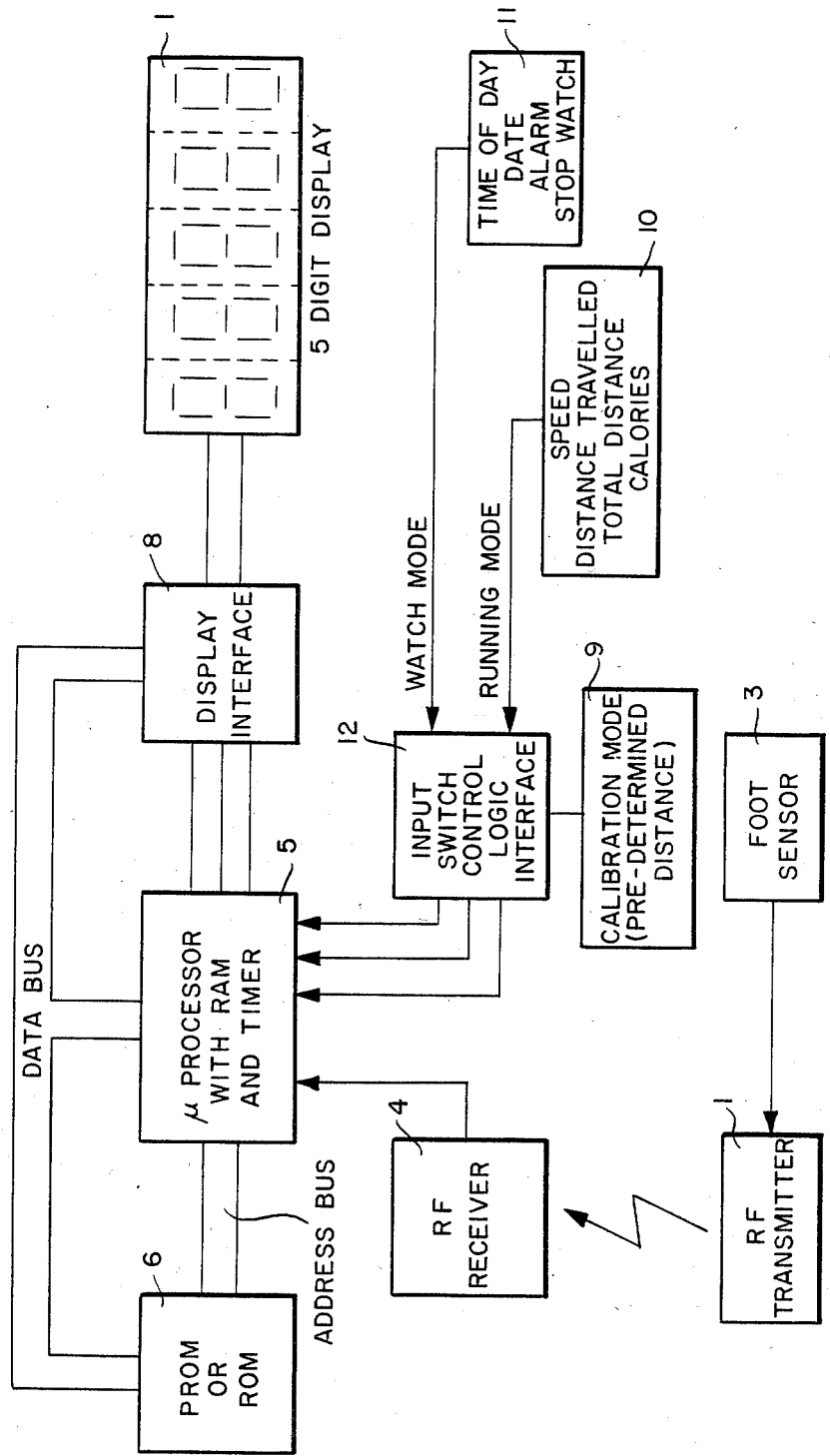
FIG. 4 is a block diagram showing the inter-connection of the various elements of the invention.

FIG. 4 shows the interconnection of the various components of the apparatus of the invention. As shown in FIG. 4, foot sensor 3 provides a first output signal when the foot of the runner is in contact with the running surface and a second output signal when the foot is not in contact with the surface. Foot sensor 3 may be a mechanical switch of suitable size and configuration as already known in the art or may be a miniature pressure transducer such as Model No. 140 manufactured by Precision Measuring Company of Ann Arbor, Mich.

As further shown in FIG. 4, the output of sensor 3 is coupled to radio frequency transmitter 1 which includes means for encoding the output of foot sensor 3 into a transmitted signal. Transmitter 1 may also be of the type already known in the art such as manufactured by National Semiconductor under Model No. LM 1871. Transmitter 1 may operate on any frequency selected from the 27 MHz or 49 MHz band using amplitude or frequency modulation. Battery 2 supplies power to transmitter 1.

The transmitted signal from transmitter 1 is received and decoded by receiver 4. Receiver 4 may also be of the type known in the prior art such as manufactured by National Semiconductor under Model No. LM 1872. Receiver 4 may also be selectively tuned to receive the signals of several different transmitters operating on different frequencies so that the performance of several runners may be monitored from a remote location.

Once received and decoded by receiver 4, the transmitted signal is coupled to microprocessor 5. Microprocessor 5 may be selected from various microprocessors known in the prior art, including Model No. CDP 1805AC manufactured by Radio Corporation of America. Microprocessor 5 executes a stored program in prom 6 to process the received signals from receiver 4 into the speed of the runner, distance traversed and calories expended. Microprocessor 5 also maintains running elapsed time and provides normal watch functions such as time of day, data, alarm and stop watch timing signals. The various values calculated by microprocessor 5 are displayed on display 7 through display interface 8. Calibration mode 9, run mode 10 and watch mode 11 of the device are switch selectable through input switch control logic interface 12.

A typical calibration mode will now be described with reference to FIG. 4. The calibration mode (9) is entered by depressing a switch which is interfaced to microprocessor 5 through appropriate input switch control logic interface 12. Interface 12 provides any switch debouncing that is required. The user also inputs a first predetermined distance for the first calibration run as also indicated by box 9. At the beginning of the first calibration run, the calibration sequence is started by an appropriate input switch, not shown. During the calibration run, the microprocessor determines the length of each foot contact time and the number of foot contacts from the first and second output signals of foot sensor 3. These determined foot contact times and numbers of foot contacts are stored in internal random access memory. At the end of the first calibration run, an average foot contact time is calculated by summing all of the foot contact times and dividing by the number of foot contacts. Also, the elapsed time for the run is determined; the speed of the run in minutes per mile is calculated from the elapsed time and distance; and the calculated value of the speed is stored.

In a second calibration run a predetermined distance is again selected by the user and inputted. The calibration run is repeated at a different speed, preferably a substantially different speed, than the first calibration run. Foot contact times, the number of contacts and elapsed are again determined and stored. At the end of the run on average foot contact time and speed in minutes per mile are calculated.

From the first calibration run a first set of x,y values $(x_1,y_1)$ for a graph of foot contact time in seconds (x) versus speed (y) in minutes per mile is determined and stored. From the second calibration run a second set of x,y (foot contact time, speed) values $(x_2,y_2)$ is determined and stored. Since the speed to foot contact time relationship has been experimentally shown to be linear, a straight line joining these two points would be representative of the foot contact time to speed relationship for the particular runner.

The equation for a straight line is $y = A + Bx$, wherein B is the slope of the line and A is the y intercept. Thus, once the two sets of x,y values have been determined, the microprocessor can calculate the A and B constants for the equation in the following manner and, thereafter the equation for the straight line (for the particular runner) can be used to calculate the speed y of the runner from foot contact time x.

To calculate the B value (slope) the microprocessor solves the equation $$B = \frac{y_2 - y_1}{x_2 - x_1}$$

Thereafter the microprocessor determines the A value (y intercept) by solving the equation for the slope at the y intercept value, i.e., $$B = \frac{y_2 - y_0}{x_2 - x_0}$$

where $x_0 = 0$ and by definition $y_0 = A$, so that $A = y_2 - Bx_2$. With the $y_2$ and $x_2$ values stored from the calibration run and the B value already calculated, the A value is determined. The calculated A and B values for the particular runner are then stored and the linear equation y(speed) = A + Bx (foot contact time) is used in the manner described hereinafter to determine the speed of the runner merely by determining foot contact time.

A typical run mode sequence will now be described with reference to FIG. 4. Run mode 10 is entered at the start of the run or jog by depressing an appropriate switch, not shown, which is coupled to microprocessor 5 through input switch control logic interface 12. As the shoe of the runner containing foot sensor 3, transmitter 1 and battery 2 comes into contact with the surface, a first output signal is generated by sensor 3 representing that a foot of the runner is in contact with the surface. When the shoe of the runner leaves contact with the surface, a second output signal is generated by sensor 3 representing that the foot of the runner is no longer in contact with the surface. The first and second output signals are coupled to RF transmitter 1 and transmitted to receiver 4. The signals received by receiver 4 are coupled to microprocessor 5. Thus, the signals available at microprocessor represents when the foot comes into contact with the ground and when the foot leaves contacts with the ground. Microprocessor 5 is therefore able to determine the length of time that the foot of the runner is in contact with the surface. Microprocessor 5 accordingly converts foot contact time to speed using the stored relationship established during the calibration mode. Preferably, the foot contact time which is used to calculate speed is an average foot contact time determined by averaging a number of successive foot contact times, for example, eight successive contact times. The calculated speed is accordingly selectively displayed on display 7 through display interface 8. Interface 8 converts the usually low power output of a microprocessor to signals suitable to drive display 7. Speed is continuously calculated by measuring foot contact time and is instantaneously available for display. Microprocessor 5 also maintains running elapsed time.

Once speed is calculated, microprocessor 5 calculates distance traversed by taking the product of speed and running elapsed time. The number of calories (in kilocalories) expended during the run, is also calculated by taking the product of the body weight of the runner in kilograms, distance traversed in kilometers and the constant 0.98. Running elapsed time, distance traversed and calories expended also may be selectively displayed on display 7. These values may also be stored in the read/write memory associated with microprocessor 5 for virtually an indefinite period of time.

In watch mode 11, microprocessor 5 selectively provides to display 7 normal watch function such as time of day, date, an alarm signal when a preselected time occurs and the time elapsed from a predetermined time.

Obviously, many modifications and variations of the above preferred embodiment of the invention will become apparent to those skilled in the art from a reading of this disclosure. It should be realized that the invention is not limited to the particular embodiment disclosed, but its scope is intended to be governed only by the scope of the appended claims.

I claim:

1. A device for measuring the speed of a person while running along a surface, said device comprising:
    a foot contact sensing means for sensing when a foot of the runner is in contact with the surface and producing a foot contact signal having a duration proportional to the time the foot is in contact with the surface;
    transmitting means connected to said foot contact sensing means for transmitting said foot contact signal;
    receiving means for receiving said foot contact signal transmitted by said transmitting means;
    processing means connected to said receiving means for calculating, solely from said foot contact signal, an output signal representing the speed of the runner; and
    display means connected to the output of said processing means for displaying the speed of the runner in accordance with said output speed signal.

2. The device of claim 1 wherein said processing means includes a timer means for producing output time signals representing the date, time of day and the time elapsed from a predetermined time, said display means further comprising means for displaying said date, said time of day and said elapsed time in accordance with said output time signals.

3. The device of claim 2 wherein said processing means further includes an alarm output signal when a preselected time occurs.

4. The device of claim 1 wherein said processing means further comprises means for timing a running elapsed time and generating a signal representing the time elapsed from the beginning of the run.

5. The device of claim 4 wherein said processing means further comprises means for calculating, solely from said foot contact signal and said running elapsed time, an output distance signal representing the distance traversed by the runner and means for displaying said output distance signal.

6. The device of claim 4 wherein said processing means further comprises means for calculating, solely from said foot contact time and said running elapsed time, an output calories expended signal representing the calories expended by the runner during the run, and means for displaying said output calories expended signal.

7. The device of claims 1, 4, 5 or 6 wherein said output speed signal, said running elapsed time signal, said output distance signal or said output calories expended signal are continuously calculated and selectively displayed.

8. The device of claim 7 wherein said output speed signal, said running elapsed time signal, said output distance signal or said output calories expended signal are stored for a virtually indefinite period of time and selectively displayed.

9. The device of claim 1 wherein said foot contact sensing means is a switch.

10. The device of claim 1 wherein said foot contact sensing means is a transducer.

11. The device of claim 1 wherein said transmitting means is a radio frequency transmitter.

12. The device of claim 11 wherein said radio frequency transmitter is frequency modulated.

13. The device of claim 1 wherein said receiving means is a radio frequency receiver.

14. The device of claim 13 wherein said radio frequency receiver is capable of receiving a frequency modulated signal.

15. The device of claim 1 wherein said processing means is a microprocessor.

16. The device of claim 1 wherein said display means is a liquid crystal display.

17. A device for measuring the speed of a person while running along a surface, said device comprising:
    a transducer for sensing when a foot of the runner is in contact with the surface and producing a foot contact signal having a duration proportional to the time the foot is in contact with the surface, said transducer being located in the shoe of the runner;
    a radio frequency transmitter connected to said pressure switch or transducer for transmitting said foot contact signal;
    a radio frequency receiver for receiving said foot contact signal transmitted by said frequency transmitter;
    a microprocessor connected to said radio frequency receiver for calculating, soley from said foot contact signal, an output speed signal representing the speed of the runner; and
    a liquid crystal display connected to the output of said microprocessor for displaying the speed of the runner in accordance with said output speed signal.

18. The device of claim 17 wherein said microprocessor includes a timer means for producing output time signals representing the date, time of day and the time elapsed from a predetermined time, said liquid crystal display further comprising means for displaying said date, said time of day and said elapsed time in accordance with said output time signals.

19. The device of claim 17 wherein said microprocessor further includes an alarm output signal when a preselected time occurs.

20. The device of claim 17 wherein said microprocessor further comprises means for timing an elapsed time and generating a signal representing the time elapsed from the beginning of the run.

21. The device of claim 17 wherein said microprocessor further comprises means for calculating, solely from said foot contact signal and said running elapsed time, an output distance signal representing the distance traversed by the runner and means for displaying said output distance signal.

22. The device of claim 17 wherein said microprocessor further comprises means for calculating, solely from said foot contact time and said running elapsed time, an output calories expended signal representing the calories expended by the runner during the run, and means for displaying said output calories expended signal.

23. The device of claims 17, 20, 21 or 22 wherein said output speed signal, said running elapsed time signal, said output distance signal or said output calories expended signal are continuously calculated and selectively displayed.

24. The device of claim 23 wherein said output speed signal, said running elapsed time signal, said output distance signal or said output calories expended signal are stored for a virtually indefinite period of time and selectively displayed.

25. The device of claim 17 wherein said foot contact sensing means is a switch.

* * * * *